(12) United States Patent
Keller

(10) Patent No.: US 6,472,778 B2
(45) Date of Patent: Oct. 29, 2002

(54) LINEAR MOTION UNIT

(75) Inventor: Bernhard Keller, Wasserlosen/Kaisten (DE)

(73) Assignee: Rexroth Star GmbH (DE)

( * ) Notice: Subject to any disclaimer, the term of this patent is extended or adjusted under 35 U.S.C. 154(b) by 78 days.

(21) Appl. No.: 09/765,856

(22) Filed: Jan. 19, 2001

(65) Prior Publication Data

US 2001/0024535 A1 Sep. 27, 2001

(30) Foreign Application Priority Data

Jan. 24, 2000 (DE) .......................... 100 02 849

(51) Int. Cl.$^7$ ............................... H02K 41/00
(52) U.S. Cl. ............................ 310/12; 292/81; 292/83; 384/26; 74/89.32; 74/89.36
(58) Field of Search ............................ 310/12, 13, 14; 318/135; 292/81, 83; 384/7, 26, 35; 74/89.32, 89.36, 89.22

(56) References Cited

U.S. PATENT DOCUMENTS

| | | | |
|---|---|---|---|
| 832,284 A | * 10/1906 | White | 292/83 |
| 3,109,335 A | 11/1963 | Gerchow | 82/141 |
| 4,744,287 A | 5/1988 | Miyamoto | 92/13.7 |
| 4,878,390 A | 11/1989 | Hauser | 74/424.94 |
| 5,531,557 A | * 7/1996 | Springer | 414/401 |
| 5,974,904 A | * 11/1999 | Dirschbacher et al. | 74/89.32 |

FOREIGN PATENT DOCUMENTS

DE 3701257 7/1987

OTHER PUBLICATIONS

English lanuguage abstract for EP 327 705. (Date unknown).

German publication: "Moderne Technik von A bis Z", Verlag Tüv Rheinland, Fach buchverlag Leipzig, 1. Auflage, ISBN 3–343–00330–1, p.321, 1991. (Month unknown).

* cited by examiner

*Primary Examiner*—Nestor Ramirez
*Assistant Examiner*—Judson H. Jones
(74) *Attorney, Agent, or Firm*—Baker Botts LLP

(57) ABSTRACT

A linear motion unit (10) includes a runner (14) that is arranged so as to be movable along a rod (12). Provided in front of and/or behind the runner (14) are support units (20) that support the rod (12) relative to a counter-element (18). Provided on the runner (14) and the support units (20) are catches (28) that in each case can be brought into latched engagement with the adjacent support unit (20). The support units (20) are each comprised of a base body (22) upon which is movably mounted a control element (24). The control element (24) can be moved between at least one latched position and at least one released position by means of a control track (30). In accordance with the invention, the control element (24) has at least one control recess (24b). Furthermore, the control track (30) includes at least one control projection (34e) that is arranged at an angle to the direction of motion (L), so that when the support unit (20) moves in the direction of motion (L), the control projection (34e) moves the control element (24) essentially perpendicular to both the direction of motion (L) and the direction of extension of the recess.

23 Claims, 6 Drawing Sheets

LINEAR MOTION UNIT

BACKGROUND OF THE INVENTION

The invention relates to a linear motion unit with a runner that is arranged so as to be movable back and forth along a rod, wherein there is provided in front of and/or behind the runner, in the runner's direction of travel, at least one support unit that supports the rod relative to an essentially rigid counter-element. There is provided on the runner or a unit connected thereto a catch that can be brought into latched engagement with each support unit. The support unit comprises a base body that is longitudinally slidable relative to both the rod and the counter-element in the direction of motion yet is guided in a nonrotating manner with respect to the direction of travel, upon which base body is mounted a control member that can be moved between at least one latched position and at least one released position by means of a control track provided on the counter-element.

The aforementioned support units are usually used with linear motion units of this type in order to prevent sagging or bending of the rod when the length of the rod exceeds a maximum dimension that is a function of its diameter, its construction and the operating conditions to which it is subjected, among other factors. Naturally, the rod is subject to gravity regardless of the precise embodiment of the linear motion unit. In the case of linear drives in which the rotation of a rod embodied as a threaded spindle is translated into a linear motion of a runner including a threaded nut, there are also centrifugal forces acting on the threaded spindle that result from its rotation. Through the use of the support units mentioned, it is possible to keep the unsupported lengths of rod short enough that the sagging and/or bending of the rod between two adjacent support points does not exceed a tolerable amount.

Naturally, the support units must not hinder the movement of the runner. It must therefore be possible for the runner, as it moves in a given direction, to progressively "pick up" the support units located in front of it in its direction of motion. In addition, however, it must also be possible, after the runner reverses its direction of motion, for it to "drop off" the previously collected support units at their intended support locations.

To this end, a type of linear drive has been proposed in EP 0 327 705 B1 in which the support units lock with the counter-element at their intended support positions. To this end, the support units are comprised of a base body that is in supportive engagement with both the rod, which is embodied as a threaded spindle, and the counter-element, which is embodied as a guide rail, and are also comprised of a control slide that is mounted in the base body so as to be movable orthogonally to the longitudinal direction of the threaded spindle. Here, the control slide is spring-preloaded with respect to the base body such that a latch provided on it is pressed against a slideway in which corresponding latch recesses are provided at the predefined support positions. In addition, a catch pin is arranged on the control slide. If the support unit is located in the region of a slide section of the slideway, the catch pin projects upward out of the support unit and engages a catch rail on the runner that carries the support unit along which the runner moves. In contrast, if the support unit is located in the region of a latch recess of the slideway, the latch falls into the latch recess as a result of the spring preloading of the control slide. The catch pin is thereby withdrawn from the catch rail of the runner, so that the latched engagement between the support unit and the catch rail is released.

A disadvantage of this solution is that when a plurality of support units are used, not only does the latch of the last support unit in the current direction of travel fall into the latch recess on the slideway provided for it, but in addition the latches of the support units arranged ahead of it do so as well when they pass by. Of course, the locking of those support units that have not yet reached their predefined positions is released by the support units that follow and are still in latched engagement with the catch rail. This ongoing latching and unlatching not only results in increased wear on the catches and latch recesses, but also leads to increased noise emission from the linear motion unit.

SUMMARY OF THE INVENTION

An object of the present invention is to provide a linear motion unit in accordance with the class that is distinguished by reduced wear and noise emission.

This object is attained in accordance with the invention by a linear motion unit of the aforementioned type in which the control element has at least one control recess extending essentially orthogonal to the direction of motion, and wherein the control track includes in at least one predetermined position a control projection that can be brought into engagement with the control recess and is arranged at an angle to the direction of motion so that, when the support unit moves, the control projection moves the control element essentially perpendicular to both the direction of motion and the direction of extension of the control recess. The primary difference with respect to the above-described solution per EP 0 327 705 B1 is that the direction of motion of the control element and the direction of extension of the control recess, in other words the latch recess in the case of EP 0 327 705 B1, are not essentially parallel to one another, but rather the motion of the control element resulting from engagement with the control projection is perpendicular to the direction of extension of the control recess of the control element. The control projection thus pushes the control element to the side, which only requires a low-noise and low-wear sliding engagement between the control projection and the parts of the control element surrounding the control recess.

It must be mentioned at this point that a "motion of the control element perpendicular to the direction of extension" must be understood to include not only an orthogonal motion of the control element essentially perpendicular to both the direction of extension and to the direction of motion, but also a circumferential motion about an axis essentially parallel to the direction of motion of the runner and/or the longitudinal axis of the rod.

Accordingly, the control element can be a control disk arranged to be rotatable on the base body about an axis essentially parallel to the longitudinal axis of the rod. However, it is also possible that the control element can be a control slide that is arranged to be movable on the base body in a direction essentially orthogonal to the longitudinal axis of the rod. In both embodiments, the control element can be held by a cover element in a recess formed between the cover element and a shoulder of the base body, which facilitates a simple design option for arranging the control element on the base body.

The latched engagement between the support unit and the runner and/or the unit attached thereto can be implemented in a simple fashion if the catch has a hook element. Moreover, an additional catch can be arranged on the base body to latch an adjacent support unit. This, as well, simplifies the design of the linear motion unit, because when a number of support units are used it is not necessary for all catches for these support units to be arranged on the runner, but instead each support unit can be brought into latched engagement with its neighboring support unit. The unit mentioned above in connection with the latched engagement that is attached to the runner can thus be a support unit that is in latched engagement with the runner, or a plurality of support units that are in latched engagement with one another and with the runner.

In order to establish and release the latched engagement, the hook element can interlock with a latch surface of the control element, and there can be provided in the latch surface at least one release recess that aligns with the hook element in the corresponding release position. Alternatively, it is also possible that the hook element interlocks with a latch surface of the base body and that the control element includes at least one cam that, in the corresponding release position, releases the engagement between the hook element and the base body.

In order to simplify the establishment of the latched engagement and/or ensure its establishment even in the case of a control element that is not adjusted precisely, it is proposed in a further refinement of the invention that the attachment of the hook element to the runner or to the unit attached thereto be accomplished by means of an arm, preferably elastic. If necessary, the latched engagement can thus be established by the locking of the hook element with the latch surface. To make this locking easier, provision can additionally be made for a guide bevel for facilitating the establishment of latched engagement to be formed on at least one of the two parts, i.e., that hook element and the control element or the hook element and the base body.

In order to be able to reliably hold the control element in the release position that at least some of the aforementioned embodiment variations require for the reestablishment of latched engagement, a safety device can be provided with a latching element, preferably spring-preloaded, that is arranged either on the base body or on the control element and that, in the release position, engages a latch recess in the other of the two parts, i.e., the control element or the base body, respectively. Alternatively, a frictionally-acting safety device can be provided, for example in the form of a brake device adjacent to the control projection that stands in braking engagement with the support unit, preferably the control member thereof. In this context, the brake device can be formed as a single piece on an angled section of the control rail. If the frictional forces already present between the control element and the base body of the support element are sufficient to prevent unintended movement of the control element, a separate safety device or brake device can be omitted altogether.

It is certainly possible for the control track arranged on the counter-element to comprise just the number of control projections required to move the control elements of the at least one support element. In order to always be able to ensure positive positioning of the control element, however, it is advantageous if the at least one control projection is part of a control rail that is arranged on the counter-element and is always engaged with at least one control recess of the control element, and preferably extends along the entire length of the rod. In this case, the control rail can have at least one straight longitudinal section and at least one angled longitudinal section, and is preferably composed of at least one straight longitudinal part and at least one angled longitudinal part. In this context, the straight section can have at least one guide projection that is arranged at essentially the same lateral position along the entire length of the straight section and is intended to engage an associated control recess, while the control projection of the angled section changes its lateral position along its length. Since the control element is thus switched along each of the angled sections in accordance with the invention, the release recess and/or the release cam also becomes aligned with the catch hook in the region of an angled section and releases the catch hook's latched engagement with the latch surface. Thus, the angled sections define the positions at which the support units that are pulled along behind the runner as a result of their latched engagement are dropped off, i.e., the support positions.

It must also be mentioned that a damping device can be provided on at least one end face of the base body. This damping device can for example be comprised of a plurality of damping elements, preferably made of rubber or a rubber-like material. This damping device serves to dampen the impact, and in particular the noise, produced as the support units are "picked up" by the runner.

The base body and/or the control element and/or the cover element and/or the elements of the control track can be made of plastic, which has a beneficial effect on the manufacturing costs of the linear motion unit in accordance with the invention.

The counter-element can be embodied as a rail, for example a guide rail for the runner, with a hollow profile open on at least one side, in whose interior space at least the rod and the at least one support unit are accommodated. This rail can, for example, be manufactured as an extruded aluminum profile.

In addition to the aforementioned possibility of embodying the linear motion unit as a roller spindle drive, the linear motion unit in accordance with the invention can also be used to advantage in other types of linear motion units. At this point, only linear bushing guides, magnetic piston units and linear motor modules will be mentioned. In magnetic piston units, the rod is implemented as a hollow tube in which a magnetic piston can be moved by the application of pressurized fluid, and the runner is coupled to the piston by magnetic forces. In linear motor modules, the rod is embodied as the push rod of a linear motor that drives the runner. The support is especially advantageous in this case, since forces of magnetic attraction between the rod and the counter-element act on the rod in addition to gravity. Since the use of support units in magnetic piston units and linear motor units was completely unknown, separate protection is sought for this concept.

BRIEF DESCRIPTION OF THE DRAWINGS

The invention is described in detail below with reference to exemplary embodiments thereof and on the basis of the accompanying drawings, in which.

DESCRIPTION OF EXEMPLARY EMBODIMENTS

Figure 1:
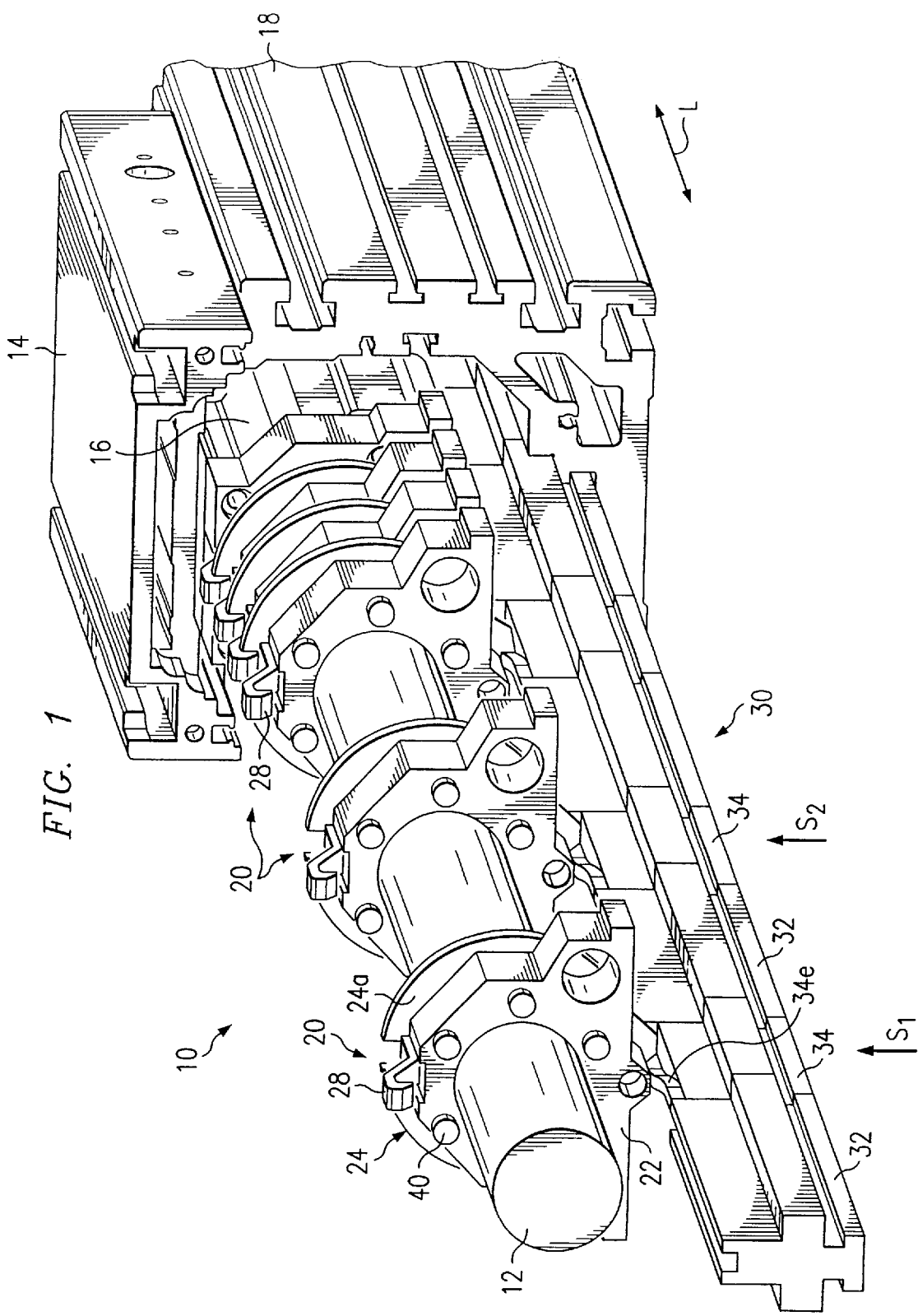
FIG. 1 is a perspective view of a linear motion unit in accordance with the invention, embodied as a roller spindle drive.

FIG. 1 shows a linear motion unit embodied as a roller spindle drive, labeled overall as 10. It is comprised of a threaded spindle 12 and a runner 14 that is connected to the threaded spindle 12 by means of a threaded nut 16. The runner 14 is supported, by means not shown in detail, so as to be movable in the direction of the double arrow L on a guide rail 18, which has an essentially U-shaped profile in cross section. The threaded spindle 12 is accommodated in the interior space 18a of the guide rail 18 (see FIG. 2), and is rotatably supported at its ends, which are not shown in FIGS. 1 and 2, on the guide rail 18 and/or on parts attached thereto. The manner in which a roller spindle drive of this type converts the rotation of the threaded spindle 12 into a linear motion of the runner 14 is generally known and thus is not described in detail here.

Also visible in FIG. 1 are a plurality of support units 20, of which the two leftmost are arranged at their associated support points $S_1$ and $S_2$, while the other support units 20 are in latched engagement with the runner 14 by means of hooks 28. The support units 20 serve to support the threaded spindle 12 on the guide rail 18 in order to prevent the spindle 12 from statically sagging or dynamically bending, as a result, for example, of excessively fast rotation. To this end, a support unit 20 is comprised of a base body 22 that is accommodated in a sliding manner in longitudinal grooves 18b of the guide rail 18 and is supported in the vertical direction V against both upward and downward motion (see FIG. 2). In addition, the base body 22 is supported in the horizontal direction H by the two side walls 18c of the guide rail 18 via flank surfaces 22b against motion to either the left or the right. The base body 22, therefore, is movable lengthwise of the rod 12 but is constrained against rotation relative thereto.

Figure 3:
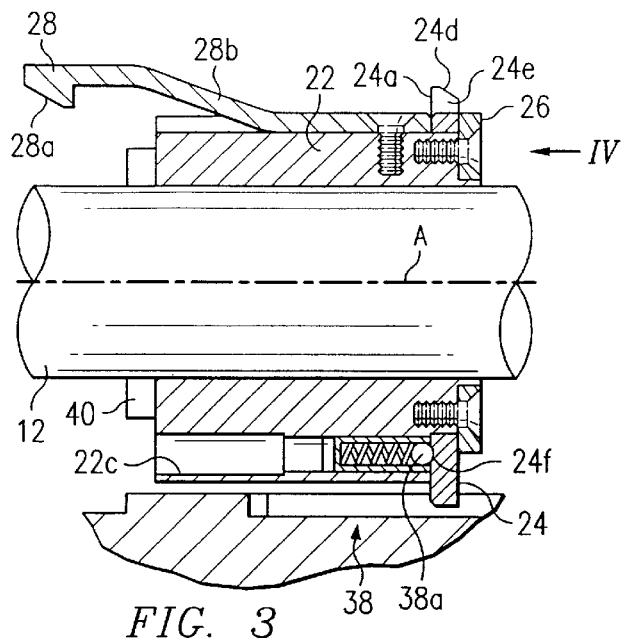
FIG. 3 is a partial cross-sectional side view of the roller spindle drive from FIGS. 1 and 2 in the region of a support unit.

The support unit 20 also includes a control disk 24 (see in particular FIGS. 3 and 4) that is supported on the base body 22, by means of a cover plate 26 attached thereto, so as to be rotatable about an axis that is essentially parallel to the axis A of the threaded spindle 12, and is in fact coaxial therewith in the example embodiment per FIG. 3. The control disk 24 is designed such that the hook 28 of a neighboring support unit 20 or of the runner 14 can engage a latch surface 24a of the control disk 24 and thus establish latched engagement. Guide angles 28a and 24d on the hook 28 and the control disk 24, respectively, with the aid of the elasticity of the hook arm 28b, facilitate the establishment of latched engagement.

Figure 2:
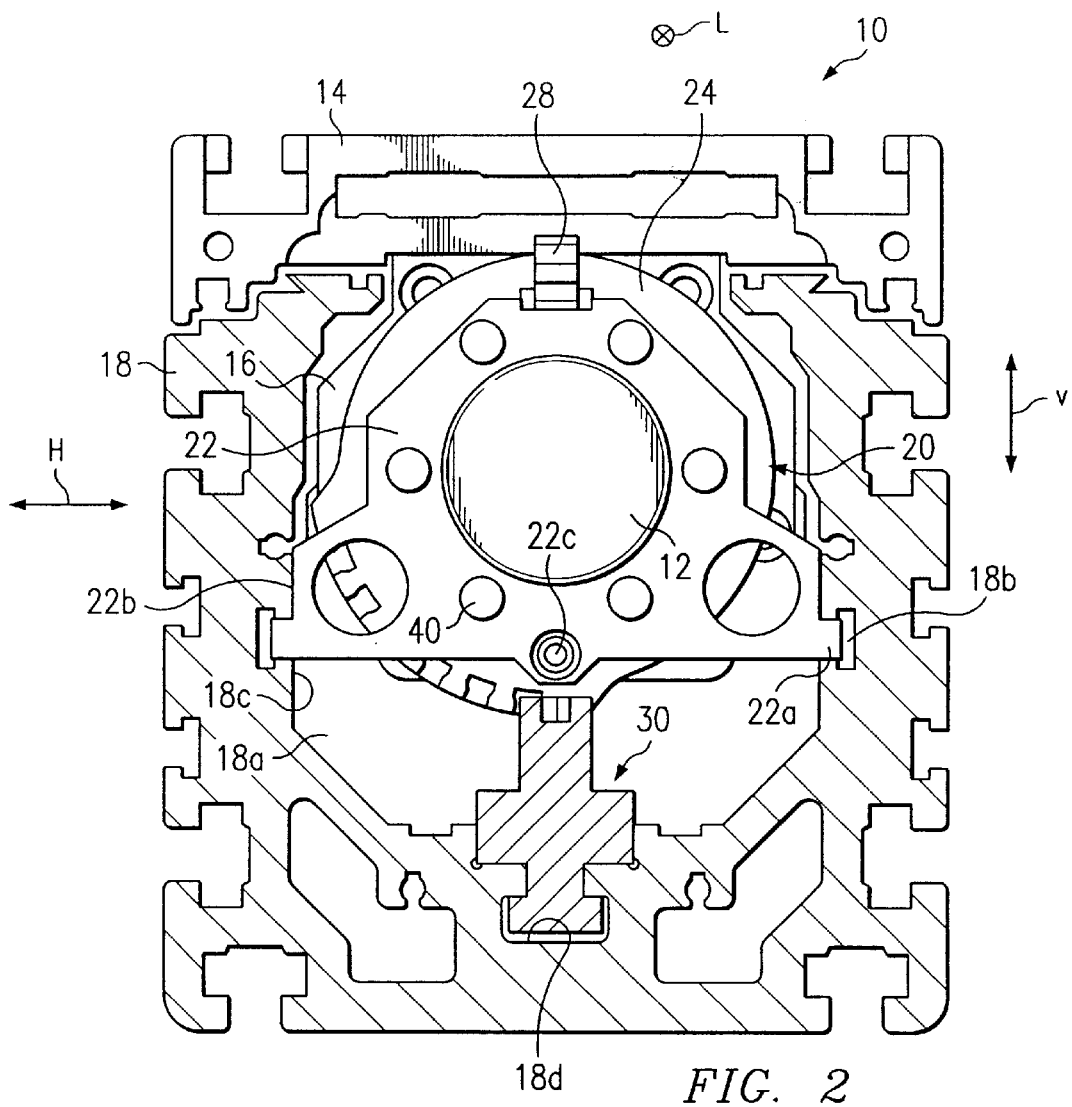
FIG. 2 is a partial cross-sectional view of the lefthand end view of the roller spindle drive of FIG. 1.
Figure 4:
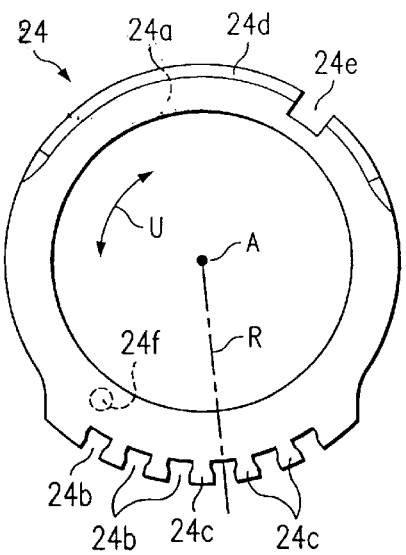
FIG. 4 shows the control disk of the support unit of FIG. 3, as an end view along arrow IV in FIG. 3.

Located on a circumferential segment of the control disk 24 on the side opposite the latch surface 24a with respect to the axis A are a plurality of control recesses 24b, each of which extends in the radial direction R and is separated from the adjacent recesses by a control tooth 24c (see FIG. 4). These control recesses 24b serve to engage a control rail 30 that is made up of a plurality of straight sections 32 and a plurality of angled sections 34. As shown in FIG. 2, the control rail 30 is fastened to the bottom of the U-profile of the guide rail 18 in a recess 18d. In the example embodiment shown, the recess 18d is shown undercut. Furthermore, the rail sections 32 and 34 have T-shaped projections 32b and 34b (see FIGS. 5 and 6), by means of which they can be pushed into the undercut groove 18d along the longitudinal direction L of the guide rail 18.

Figure 5:
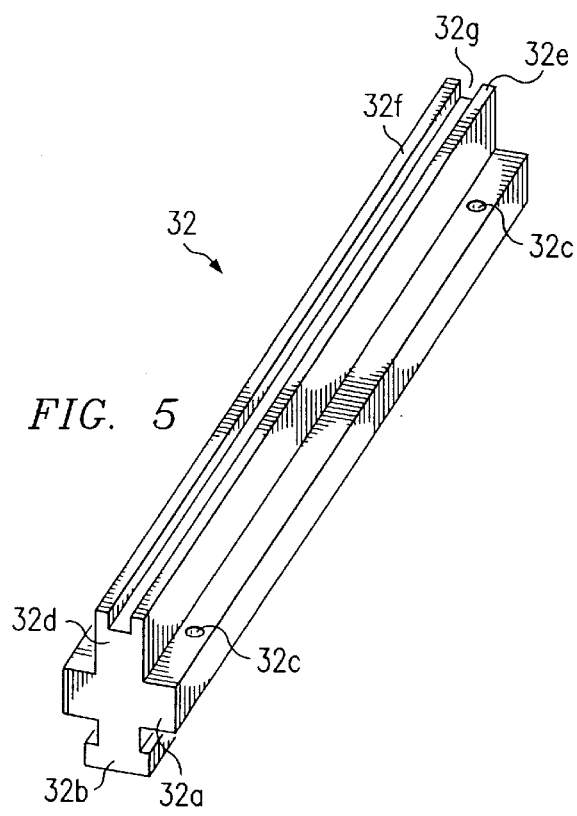
FIGS. 5 and 6 are perspective views of a straight section (FIG. 5) and an angled section (FIG. 6) of the control rail of the roller spindle drive of FIGS. 1 and 2.

FIG. 5 shows an enlarged perspective view of a straight section 32 of the control rail 30. It includes a base plate 32a that can be screwed to the guide rail 18 through holes 32c once the T-shaped projection 32b has been inserted into the groove 18d. On the side of the base plate 32a facing away from the T-shaped projection 32b, the straight section 32 includes a guide projection 32d with two straight guide projections 32e and 32f. These guide projections 32e and 32f serve to engage the control recesses 24b of the control disk 24, while one of the control teeth 24c of the control disk 24 engages the groove 32g formed between the control projections 32e and 32f. As a result of the engagement of the straight section 32 with the control disk 24, an accidental or unintended rotation of the control disk 24 about the axis A during movement of the associated support unit 20 in the direction of motion L is prevented.

Figure 6:
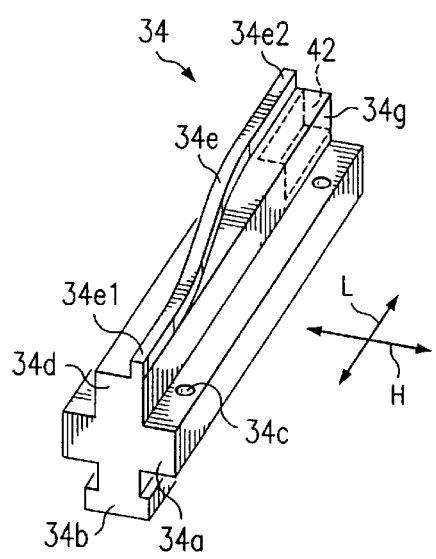

FIG. 6 shows an enlarged perspective view of an angled section 34. It includes a base plate 34a that can be attached to the guide rail 18 through holes 34c once the T-shaped projection 34b is inserted into the groove 18d of the guide rail. On the side of the base plate 34a facing away from the projection 34b, the angled section 34 has a guide projection 34d from which a single control projection 34e projects. Over the length of the angled section 34, the control projection 34e is displaced, i.e., crosses over from a lateral position 34e1 corresponding to guide projection 32e of the straight section to a lateral position 34e2 corresponding to guide section 32f of the straight section. In the example embodiment shown in FIG. 6, the control projection 34e follows a course in a plane defined by the longitudinal direction L and the horizontal direction H that approximates a half period of a sine wave, going from its minimum to its maximum.

As a result of the engagement of the control projection 34e in one of the control recesses 24b as the support unit 20 moves in the direction of motion L, the control disk 24 is rotated about its axis A by an angle that corresponds to the distance between two adjacent control recesses 24b. This is shown in detail in the series of FIGS. 7 through 9. To understand FIGS. 7 through 9, it should also be noted that this sequence of figures represents a movement to the right in FIG. 1 of one of the support units 20 in FIG. 1, where the support units 20 are seen from a point of view such as that indicated in FIG. 3 by the arrow IV.

Figure 7:
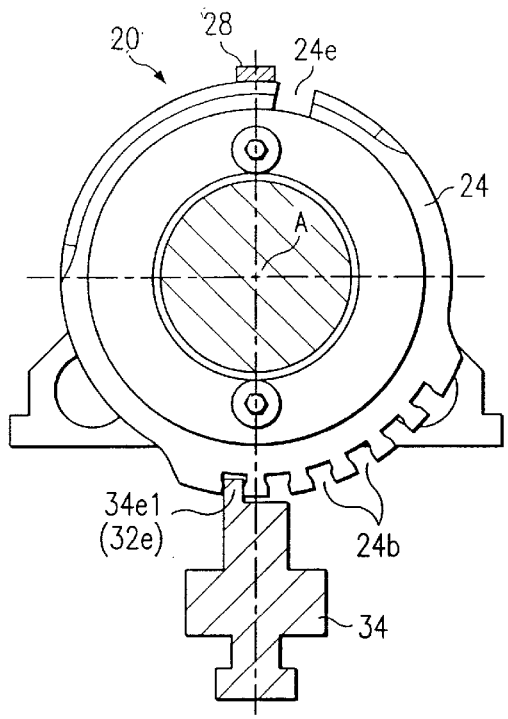
FIGS. 7, 8 and 9 illustrate the interaction of the control rail, in particular the laterally-displaced sections of the control rail, with the control disk of FIG. 4.

In accordance with FIG. 7, the support unit 20, or more precisely its control disk 24, has just left the region of engagement of a straight section 32 and is engaged with an angled section 34, specifically in the region of the lateral position 34e1 of the control projection 34e. With further motion in the direction of motion L to the right in FIG. 1, the control projection 34e changes its lateral position (see FIG. 8) until it reaches the lateral position 34e2 per FIG. 9 corresponding to the lateral position of the guide projection 32f of the straight section 32. As a result of this lateral displacement of the control projection 34e, the control disk 24 is rotated counterclockwise about the axis A by an angle corresponding to the distance between two adjacent control projections 24b of the control disk 24. The control disk 24 is thus advanced by one pitch length of the toothing 24b/24c by passing over an angled or switching section 34.

Figure 8:
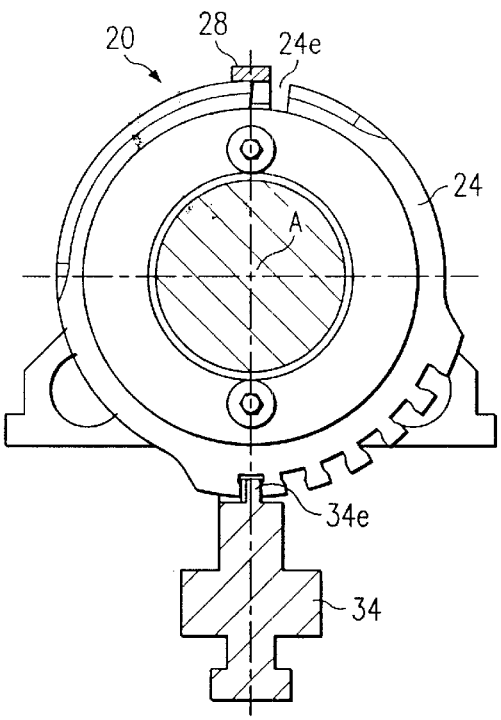
Figure 9:
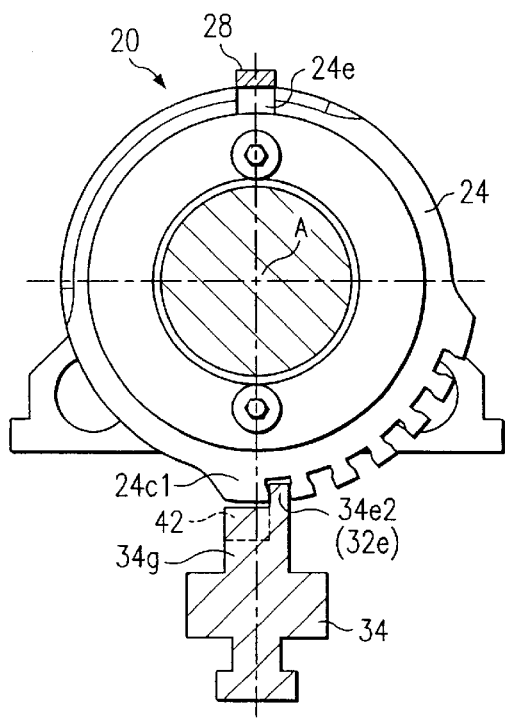

Since the control projection 34e of the angled section 34 in the depictions shown in FIGS. 7–9 is engaged with the last control recess 24b, the release recess 24e of the control disk 24, which in FIG. 7 is still out of alignment with the hook 28, is brought into alignment with the hook 28 of the adjacent support unit 20 as the angled section 34 is traversed as shown in FIGS. 7–9. Consequently, the hook 28 can come out of latched engagement with the depicted support unit 20 without needing to overcome any resistance. The control unit 20 thus comes to rest in the vicinity of the angled section 34 and remains there. In the manner described above, as the runner 14 moves to the right in FIG. 1 the support units 20 are progressively dropped off at their intended support positions $S_1$, $S_2$, etc.

It should be kept in mind that all support units 20 are of identical construction. Thus, the support position at which a specific support unit 20 is dropped off, i.e., at which the release recess 24e of the control disk 24 aligns with the hook 28 of the preceding support unit 20, is determined solely by the initial rotation of the control disk 24 with respect to the axis A. It is self-evident that the number of control recesses 24b in the control disk 24 corresponds at a minimum to the number of support units 20 that are provided on one side of the runner 14. However, it is not harmful here if a larger number of control recesses 24b is provided. Thus, control disks 24 designed for use with relatively long threaded spindles 12 can also be used as is with shorter threaded spindles 12.

With reference to FIG. 3, it should also be noted that the support unit 20 also has an antirotation feature 38, which is, for example implemented as a spring-loaded detent ball 38a that is accommodated in a bore 22c in the base body 22 and engages a latch recess 24f of the control disk 24 when the release recess 24e is aligned with the hook 28 of the adjacent support unit 20 as shown in FIG. 9.

The antirotation feature 38 ensures firstly that the release recess 24e remains in the position aligned with the hook 28 after the latched engagement is released, so that reestablishment of the latched engagement can take place without difficulty. The locking of the control disk 24 can also ensure that the support unit 20 cannot, on its own, traverse either the angled section 34 just behind it in the direction of travel or the next angled section 34 in the direction of travel. Thus, linear motion units 10 equipped with support units 20 in accordance with the invention can also be used without difficulty as Z-axes, i.e., as axes of motion where the longitudinal axis L of the rod 12 runs vertically in the stationary coordinate system described above, rather than horizontally. When the runner 14 moves upward in this case, the support units 20 located below the runner 14 remain in the vicinity of the angled section 34 that produced the aligned configuration of the release recess 24e with the hook 28. In contrast, support units 20 arranged above the runner 14 follow the runner's downward motion until they reach the next angled section 34. However, this effect can be taken into account without further effort in setting the initial rotational positions of the control disks 24.

Figure 13:
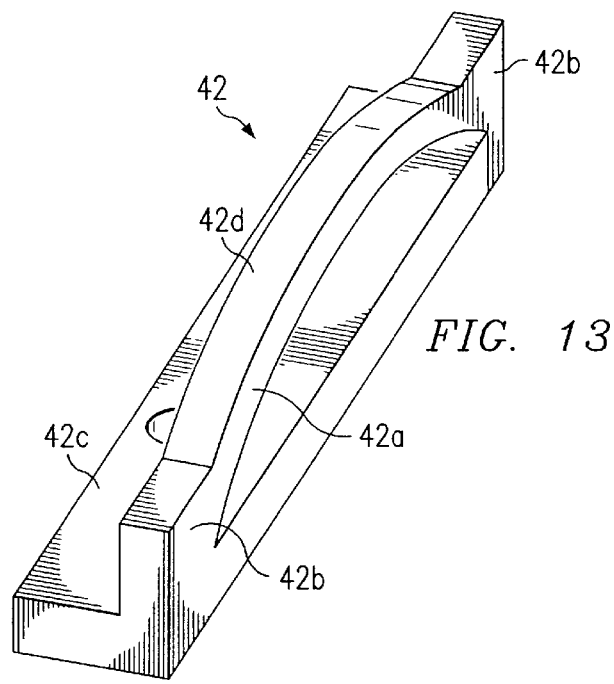
FIG. 13 shows a view similar to FIGS. 5 and 6 of a brake and retaining element for a support element from FIGS. 3 and 11.

Should the weights of the support units 20 be so large that the antirotation feature 38 alone is not able to hold the relevant support unit 20 in its designated support position, additional brake and retaining elements 42 can be provided in the region of the angled sections 34 (see FIG. 13). The angled section 34 preferably has a recess 34g for this purpose in which the brake and retaining element 42 can be accommodated. For example, this recess 34g is indicated by dashed lines in FIGS. 6 and 9.

The brake and retaining element 42 can, for example, be embodied as a spring clip, as is shown in FIG. 13. As there shown, it is comprised of an arched web 42a that is connected at both of its ends 42b to a base plate 42c. The apex 42d of the arched web 42a projects beyond the base plate 42c sufficiently far that, when the control disk 24 has reached the position shown in FIG. 9, the apex 42d can frictionally engage the end face of a control tooth 24c1 in the end position on the control disk 24. In this way, the brake element 42 can exert on the control disk 24 and thus on the entire support unit 20, a force that brakes the motion thereof.

It should be kept in mind that when the support unit 20 has not yet reached the support position designated for it, the control disk 24 is arranged such that upon passing over the brake element 42, the lateral position of one of the control recesses 24b is aligned with the lateral position of the brake element 42. As a result, the brake element 42 cannot exert any braking force on this support unit 20, and the support unit 20 can move past the brake unit 42 unimpeded. Thus, the undesired generation of noise is reliably prevented in spite of provision of the brake elements 42.

The braking force exerted by the brake element 42 on the support unit 20 can be influenced by the selection of shape and/or material. In particular, the clip 42a does not need to be connected at both its ends 42b to the base plate 42a. In order to be able to increase the elastic deformability of the clip 42a and thus decrease the braking force, the spring clip can, for example, be connected to the base plate at only one of its ends.

Figure 17:
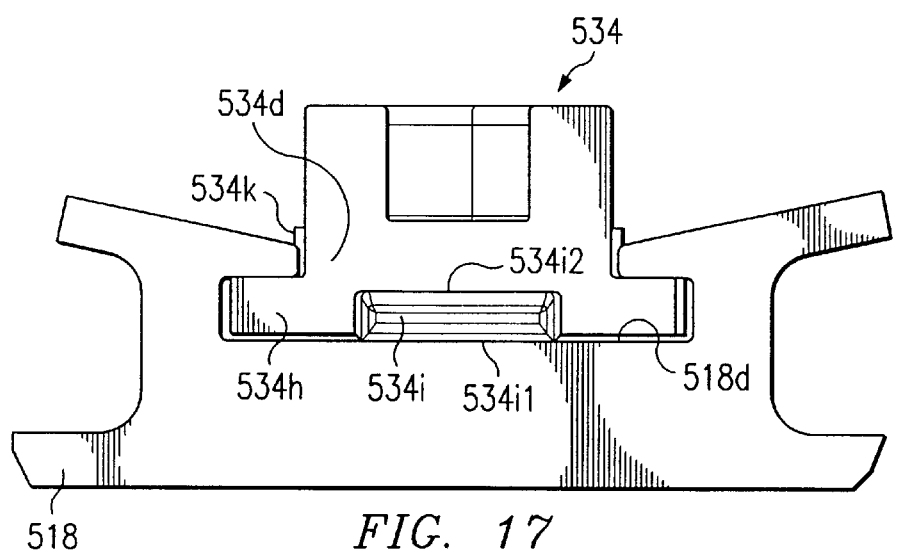
FIG. 17 shows an end view in the direction of the arrow P of the angled section from FIG. 16, assembled in the guide rail of the roller spindle drive.
Figure 16:
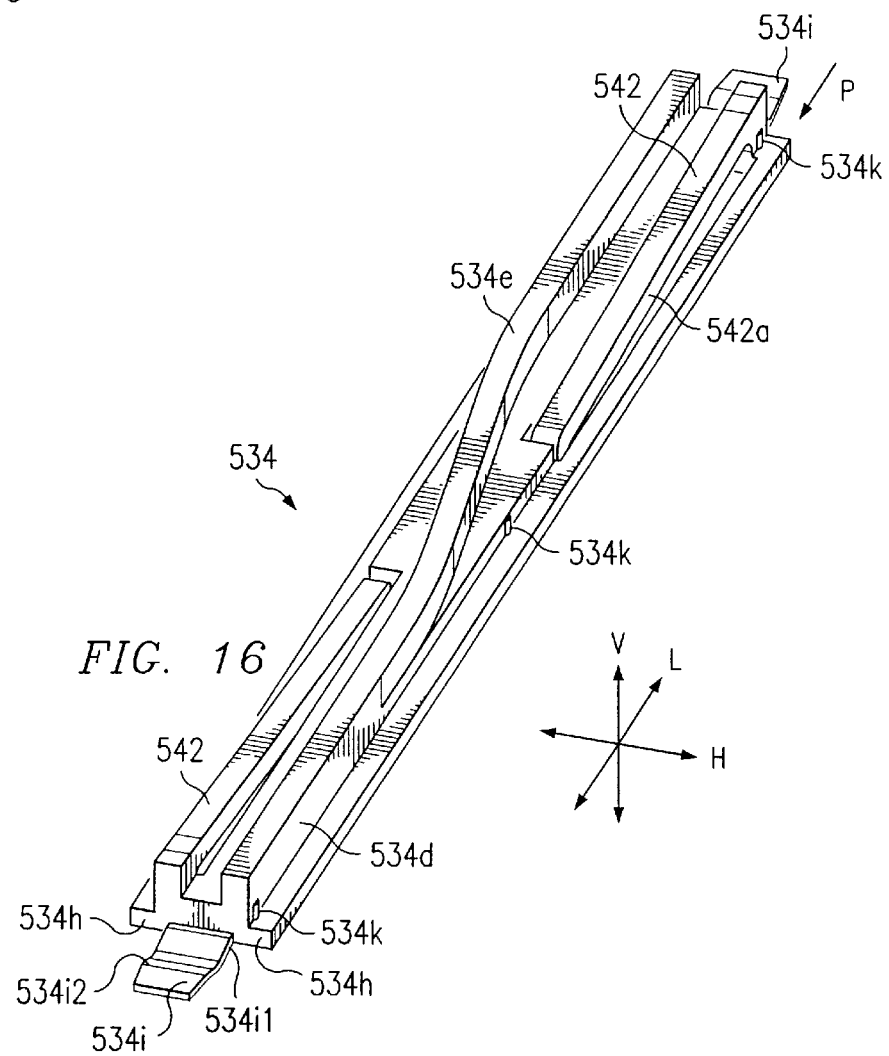
FIG. 16 shows a view similar to FIG. 6 of another embodiment of an angled section of a control rail of a roller spindle drive in accordance with the invention.

FIGS. 16 and 17 show another embodiment of an angled section of a control rail for a roller spindle drive in accordance with the invention. This angled section corresponds in its function to the angled section 34 shown in FIG. 6 and is equipped with a brake device 42 as shown in FIG. 13. It and differs therefrom only in certain design details. Consequently, analogous parts in FIGS. 16 and 17 are labeled with the same reference numbers as in FIGS. 6 and 13, increased by 500. In addition, the angled section 534 from FIGS. 16 and 17 is described below only to the extent that it differs from the angled section 34 in FIGS. 6 and 13, whose description is explicitly referenced here in all other regards.

The primary difference between the angled section 534 and the angled section 34 is that the brake devices 542 are formed on the angled section 534 as a single piece, which has manufacturing advantages. Furthermore, the clip 542a of the brake devices 542 is designed in the form of a ramp which rises toward the longitudinal ends of the angled section 534, so that the entire length of the clip 542a can be used to brake the support unit 20.

Like the angled section 34 in FIG. 6, the angled section 534 in FIGS. 16 and 17 also has a guide projection 534d that provides lateral guidance of the angled section 534 in the receiving groove 518d of the guide rail 518 (see FIG. 17). For guidance in the vertical direction V, the angled section 534 has lateral projections 534h that preferably extend along its entire length. Furthermore, provided at each longitudinal end of the angled section 534 is a spring element 534i that is curved in the longitudinal direction L in such a way that it rests with the lower periphery of a first antinodal point 534i1 on the bottom of the receiving groove 518d and the lateral projections 534h press upward in contact with the periphery of the receiving groove 518d. In contrast, the upper periphery of a second antinodal point 534i2 of the spring element 534i provides precisely fitting alignment of the adjacent straight section of the control rail.

Also worthy of mention are the shoulders 534k that are distributed on both sides of the guide projection 534d in the longitudinal direction of the angled section 534. These shoulders 534k serve to improve the axial position locking of the angled section 534 in the receiving groove 518d. To this end, they are designed with a slight oversize in terms of the difference between the width of the opening of the groove 518d and the width of the guide projection 534d. This oversize is at least partially squeezed or compressed when the angled section 534 is pushed into the groove 518d so that the angled section 534 is firmly seated in the receiving groove 518d. Of course, the straight sections adjoining the angled sections can also be designed to correspond to the angled section 534 described above in terms of guidance and seating in the receiving groove 518d, namely with lateral projections (corresponding to 534h), shoulders (corresponding to 534k) and spring elements (corresponding to 534i) or recesses to accommodate such spring elements.

It should be emphasized that the brake device 42 in accordance with the invention can, of course, also be advantageously replaced by a rod that extends essentially horizontally or with only slight inclination in order to be able to reliably bring the support units 20 to a stop at their designated support positions and hold them there.

Moreover, it must be added that damping elements 40 are arranged on one end face of the base body 22 of the support units 20; see, for example, FIGS. 1 and 3. The damping elements 40 are accommodated in corresponding recesses of the base body 24 and extend a predetermined distance therefrom, so that, in the event of impact between two adjacent support units 20, they can dampen the impact and the associated noise emission. The number, the dimensions, and the material and/or material properties of the damping elements 40 can be chosen as desired as a function of the specific application case.

Figure 10:
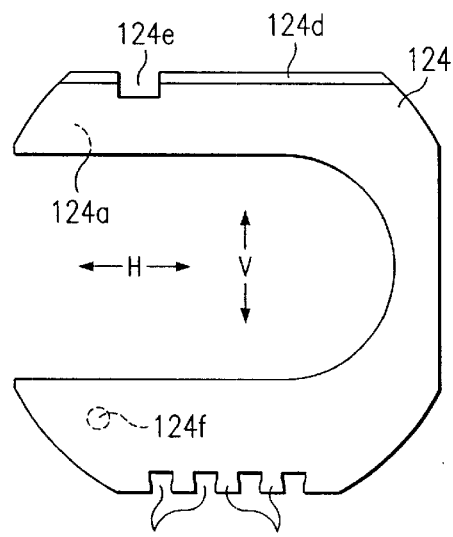
FIG. 10 shows a representation similar to FIG. 4 of a control element embodied as a control slide that can be used in a support element similar to FIG. 3.

Although reference is made in the above to an embodiment wherein the control disk 24 executes a rotary motion in the circumferential direction U about the axis A upon crossing an angled section 34 (see for example FIG. 4), it is likewise possible, given sufficient space in the rail 18, to use a control slide 124 such as, for example, that depicted in FIG. 10. This control slide 124 includes a plurality of control recesses 124b extending in the vertical direction V with control teeth 124c arranged between them, which can engage the guide projections 32e and 32f of the straight sections 32 and the control projections 34e of the angled sections 34 of the control rail 30 depicted in FIG. 1. However, the control slide 124 is not rotated in the circumferential direction U about an axis A upon crossing an angled section 34, but rather is displaced in the horizontal direction H. Moreover, the control slide 124 has a release recess 124e that can be brought into and out of alignment with the hook 28 of an adjacent support unit 20. Finally, a safety detent recess 124f and a guide bevel 124d for the hook 28 are also provided on the control slide 124. Although the control slide 124 as shown in FIG. 10 is embodied as an essentially U-shaped part that is open to the left, it can also be embodied as a closed annular part where the hole in the annulus takes the form of an oblong hole. The functioning of the control slide 124 otherwise corresponds to the control disk 24 in FIG. 4.

The embodiments described above, with the control disk 24 as shown in FIG. 4 and the control slide 124 as shown in FIG. 10, have the advantage that in principle their function does not require any latching action. Thus, the arm 28b of the hook 28 (see FIG. 3) can be essentially rigid. It should be remembered that the guide bevels 28a and 24d are provided merely for safety reasons, and that the establishment of latched engagement between the hook 28 and the control disk 24 or its latching surface 24a can otherwise take place without latching action, for example, in that hook 28 is passed through the release recess 24e and is subsequently locked to the control disk 24 by rotation of the control disk 24 and movement of the release recess 24e out of alignment with the hook 28. However, as will be described below in detail with the aid of FIGS. 11 and 12, other embodiments are conceivable wherein latching of the hook onto the support unit is deliberately utilized to establish latched engagement and wherein this latching is subsequently released through the use of a control cam.

Figure 11:
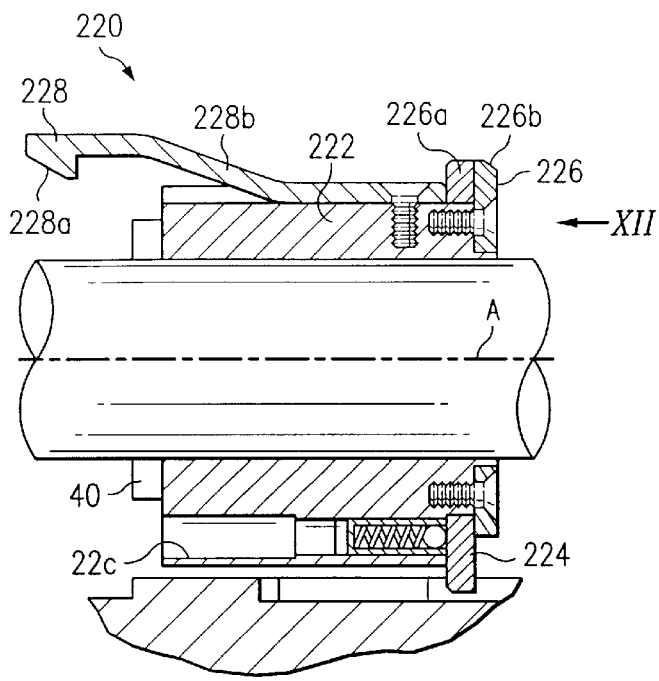
FIG. 11 shows a view similar to FIG. 3 of a further embodiment of a support unit.
Figure 12:
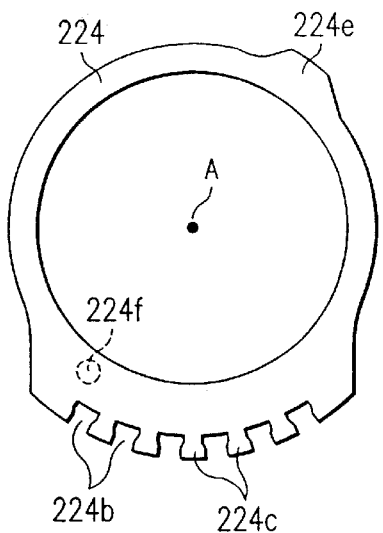
FIG. 12 shows a view similar to FIG. 4 of the control disk of the support element of FIG. 11, as an end view along arrow XII in FIG. 11.

In the case of the support unit 220 shown in FIG. 11, the hook 228 engages a latch surface 226a of the cover disk 226, which holds the control disk 224 on the base body 222 of the support unit 220 so that said control disk 224 can rotate about the axis A. Guide bevels 228a on the hook 228 and 226b on the cover disk 226 assist in the latching of hook 228 and cover disk 226. Embodied on the control disk 224, as shown in FIG. 12, is a release cam 224e which, when aligned with the hook 228, elastically deforms the arm 228b of the hook 228 such that the latching between hook 228 and cover disk 226 is released. With regard to the control toothing 224b/224c and the safety latch recess 224f, the structure and function of the control disk 224 correspond to the control disk 24 as shown in FIG. 4.

Although the above-described structure and function of the support units 20 were explained using the example of a roller spindle drive 10 with a threaded spindle 12, it should be noted that the support units in accordance with the invention can also be used with other types of linear motion units. In the following, two other possible applications will be mentioned, merely as examples, with reference to FIGS. 14 and 15.

Figure 14:
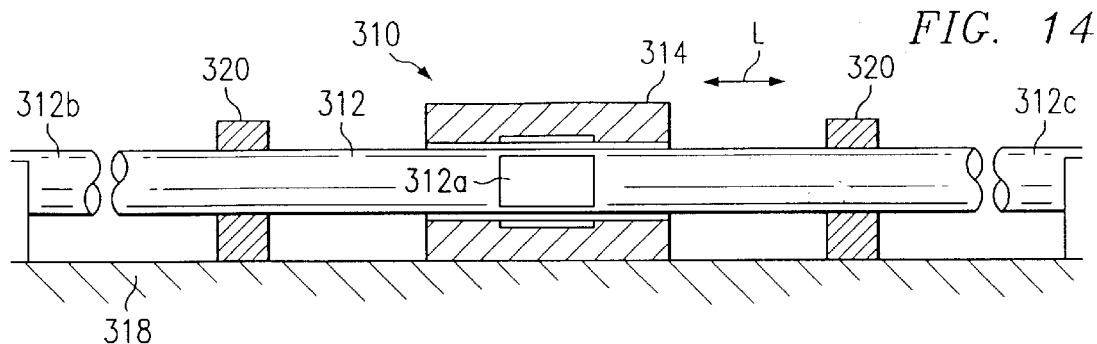
FIGS. 14 and 15 show schematic side views of linear motion units in accordance with the invention, implemented as a magnetic piston unit (FIG. 14) and as a linear motor module (FIG. 15)

As shown in FIG. 14, the linear motion unit 310 is embodied as a magnetic piston unit. The rod of this magnetic piston unit takes the form of an elongated tube 312 that is supported on a base plate 318. A piston 312a equipped with permanent magnets is accommodated such that it can be moved back and forth in the longitudinal direction L by means of the corresponding supply or removal of pressurized fluid through pipe connections 312b and 312c. In this embodiment, the runner is embodied as a sled 314, slidably mounted on the tube 312, that is coupled to the magnetic piston 312a by magnetic forces and follows its motion in the longitudinal direction. In order to be able to reliably prevent sagging of the tube 312, support units 320 that are "picked up" and/or "dropped off" by the runner 314 as it moves can be provided as in the example embodiments described above.

Figure 15:
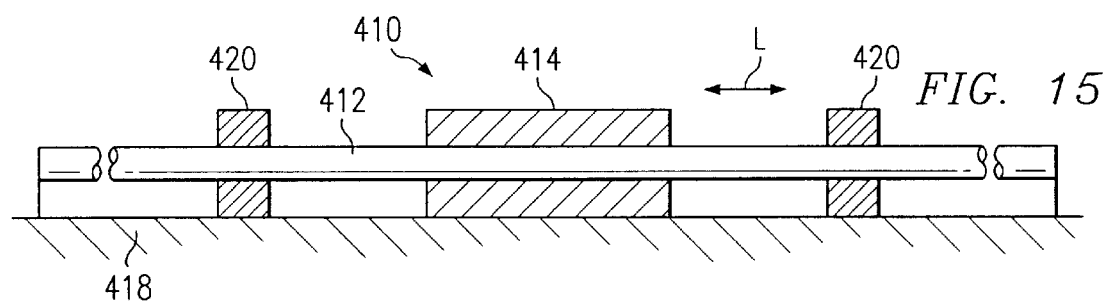

A further exemplary embodiment of a linear motion unit in accordance with the invention is the linear motor module 410 shown in FIG. 15, in which a runner 414 is slidable in the longitudinal direction L on a permanent-magnet rod 412. The permanent-magnet rod 412 with the runner 414 and a magnetically conductive base plate 418 form a magnetic circuit of a linear motor. In addition to gravity, in this embodiment magnetic forces arise between the push rod 412 and the base plate 418 which attempt to deform the rod 412. Thus, support units 420 that support the rod 420 relative to the base plate 418 can be provided in this embodiment as well.

In the embodiment of FIGS. 14 and 15, it will be understood that the base plates 318 and 418 can be constructed similarly to the guide rail 18 in FIG. 1 and that a control rail similar to that shown at 30 in FIG. 1 could also be provided.

What is claimed is:

1. A linear motion unit, comprising:
   an elongate rod having a longitudinal axis;
   a rigid counter-element extending lengthwise of said rod;
   a runner mounted on said rod for movement lengthwise thereof in a direction of travel (L);
   at least one support unit including a base body for supporting said rod relative to said counter-element and being located either in front of or behind said runner in the direction of travel (L);
   means for supporting said base body for lengthwise movement relative to said rod and to said counter-element and for constraining said base body against rotational movement relative to said rod and to said counter-element;
   a catch member carried by said runner for releasably engaging in latching relationship with said at least one support unit;
   a control element mounted on said base body for movement between at least one latch position and at least one release position, said control element having at least one control recess extending in a first direction (R,V) substantially orthogonal to said direction of travel L; and
   a lengthwise-extending control track mounted on said counter-element, said control track including in at least one predetermined lengthwise position a control projection for engagement with said at least one control recess of said control element, said control projection being laterally displaced over at least a portion of its length in a direction transverse to said first orthogonal direction (R,V) such that, upon lengthwise movement of said at least one support unit along said control projection in the direction of travel (L), the control projection moves said control element in a second direction (U,H) substantially orthogonal to both the direction of travel (L) and said first substantially orthogonal direction (R,V).

2. A linear motion unit in accordance with claim 1, wherein the control element comprises a control disk rotatably mounted on the base body about an axis (A) substantially parallel to the longitudinal axis of the rod.

3. A linear motion unit in accordance with claim 1, wherein:
   said second substantially orthogonal direction (U,H) is substantially orthogonal to the longitudinal axis of the rod; and
   the control element comprises a control slide mounted on the base body for movement in said second substantially orthogonal direction (U,H).

4. A linear motion unit in accordance with one of claims 1 through 3, wherein the control element is mounted on the base body by a cover element in a recess formed between the cover element and a shoulder of the base body.

5. A linear motion unit in accordance with claim 1, wherein the catch member comprises a hook element.

6. A linear motion unit in accordance with claim 5, wherein said at least one support unit further comprises a hook element for latching engagement with an adjacent support unit.

7. A linear motion unit in accordance with claim 5 or 6, further comprising:
   a latch surface on the control element of the at least one support unit for latching engagement with a hook element; and
   there is provided on the latch surface at least one release recess that aligns with the hook element in the corresponding release position of the control element.

8. A linear motion unit in accordance with claim 5 or 6, further comprising:
   a latch surface on the base body of the at least one support unit; and
   said control element has at least one cam that, in the corresponding release position of the control element, releases the engagement between the hook element and the base body.

9. A linear motion unit in accordance with claim 5, wherein the hook element is attached to the runner by means of a flexible arm.

10. A linear motion unit in accordance with claim 6, wherein the hook element is attached to the base body of the at least one support unit.

11. A linear motion unit in accordance with one of claims 5 and 6, further comprising a guide bevel on at least one of the hook element and the control element or at least one of the hook element and the base body, respectively, to facilitate the establishment of latched engagement therebetween.

12. A linear motion unit in accordance with claim 1, further comprising a releasable locking device carried in part by the base body and in part by the control element for preventing unintended movement of the control element, said locking device including a latching member on one of the base body and the control element and a cooperating latch recess on the other of the base body and the control element.

13. A linear motion unit in accordance with claim 1, wherein the at least one control projection is part of a control rail arranged on the counter-element.

14. A linear motion unit in accordance with claim 13, wherein the control rail has at least one longitudinal straight section and at least one longitudinal laterally-displaced section.

15. A linear motion unit in accordance with claim 14, wherein the straight section has at least one guide projection that is arranged at essentially the same lateral position along the entire length of the straight section and is intended to engage an associated control recess of the control element, while the control projection of the laterally-displaced section changes lateral position along the length of said laterally-displaced section.

16. A linear motion unit in accordance with claim 1, further comprising a damping device arranged on at least one end face of the base body.

17. A linear motion unit in accordance with claim 1, further comprising a braking device adjacent to the control projection for braking engagement with the support unit.

18. A linear motion unit in accordance with claim 1, wherein at least one of the base body, the control element, and the control track is composed of plastic.

19. A linear motion unit in accordance with claim 1, wherein the counter-element is a rail with a hollow profile open on at least one side, at least the rod and the at least one support unit being accommodated within the hollow profile of the rail.

20. A linear motion unit in accordance with claim 1, wherein the base body encloses the rod over essentially the entire rod circumference.

21. A linear motion unit in accordance with claim 1, wherein the base body is supported on the counter-element so as to be movable by sliding.

22. A linear motion unit in accordance with claim 1, wherein the rod comprises a threaded spindle and wherein the runner includes a threaded nut which engages said spindle.

23. A linear motion unit in accordance with claim 1, wherein said linear motion unit comprises a linear bushing guide.

* * * * *